No. 713,348. Patented Nov. 11, 1902.
S. A. RHODES.
RETINOSCOPE.
(Application filed Feb. 27, 1901.)
(No Model.) 4 Sheets—Sheet 1.
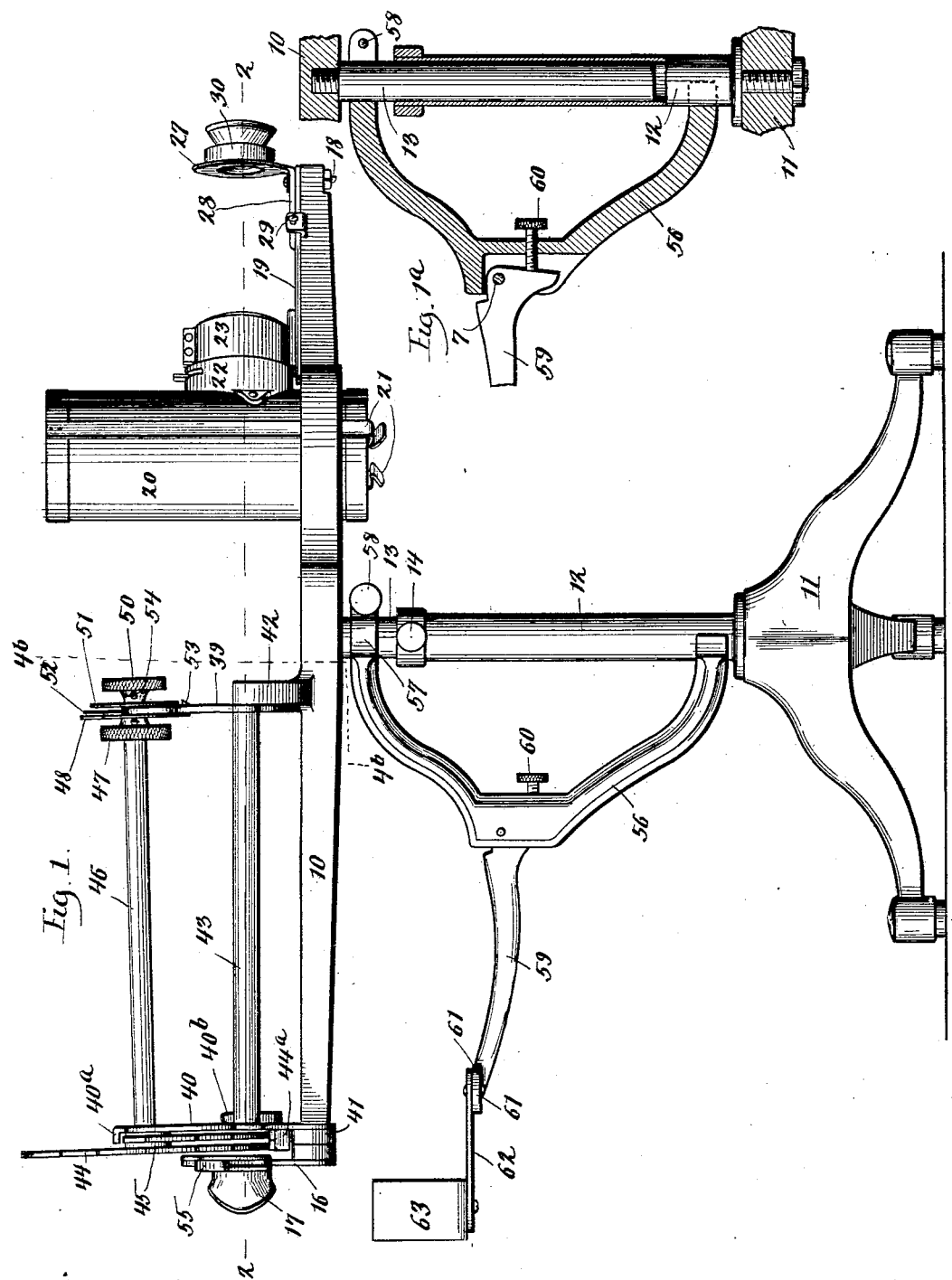
Witnesses:
Inventor:

No. 713,348. Patented Nov. 11, 1902.
S. A. RHODES.
RETINOSCOPE.
(Application filed Feb. 27, 1901.)
(No Model.) 4 Sheets—Sheet 2.
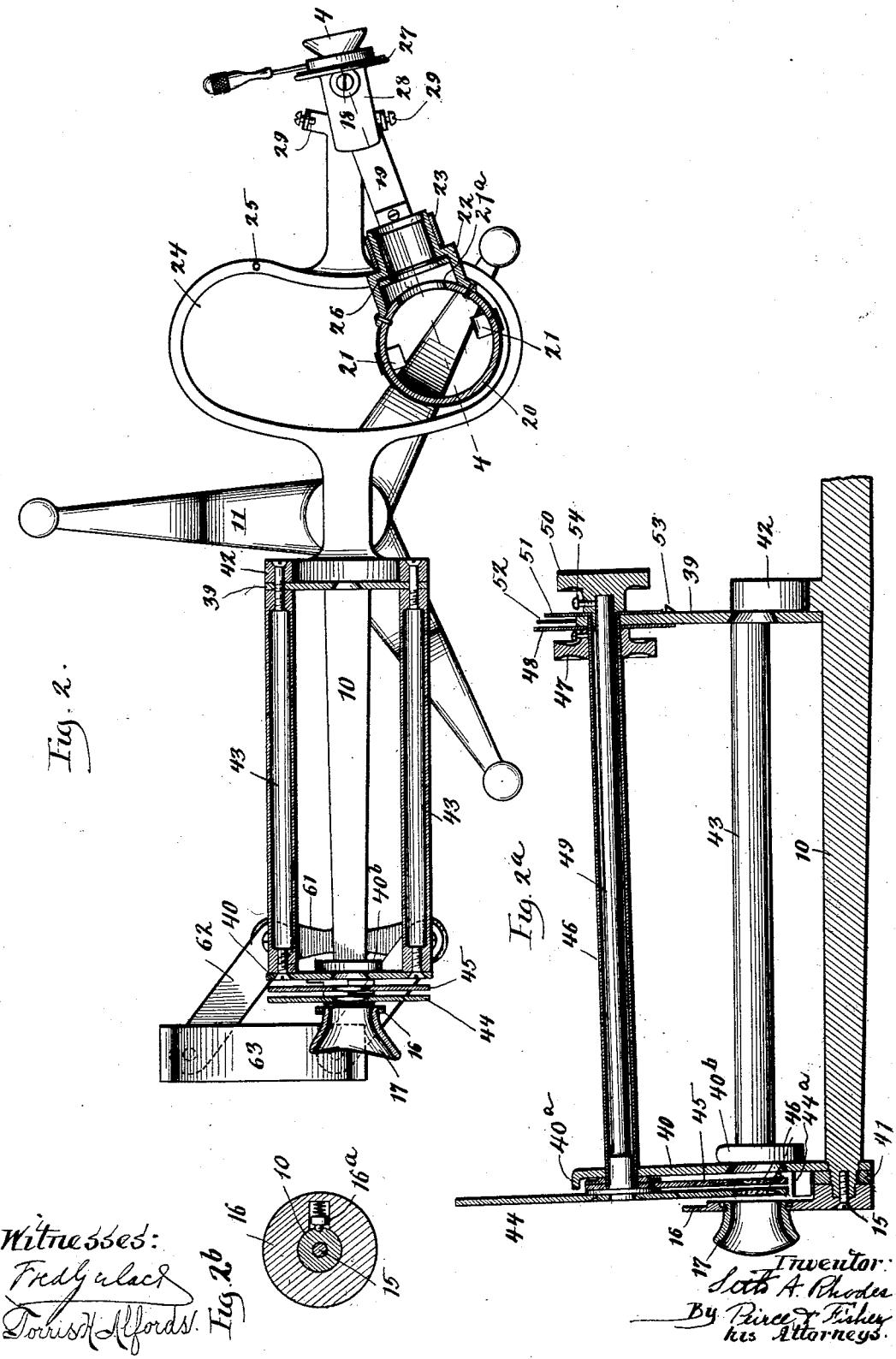
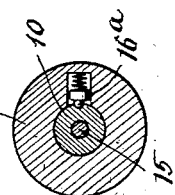

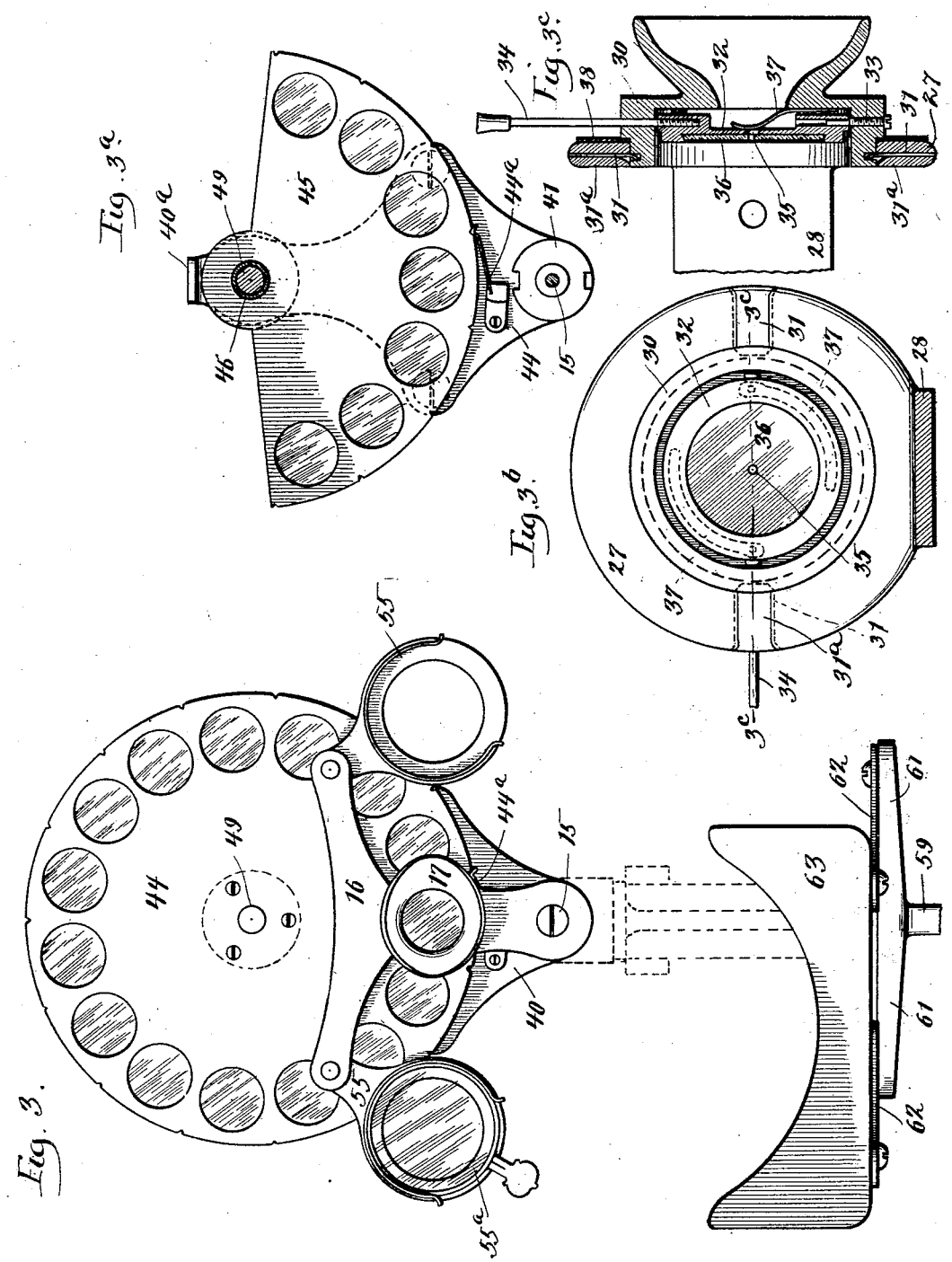

No. 713,348.  
S. A. RHODES.  
RETINOSCOPE.  
Application filed Feb. 27, 1901.
Patented Nov. 11, 1902.
(No Model.)  
4 Sheets—Sheet 4.
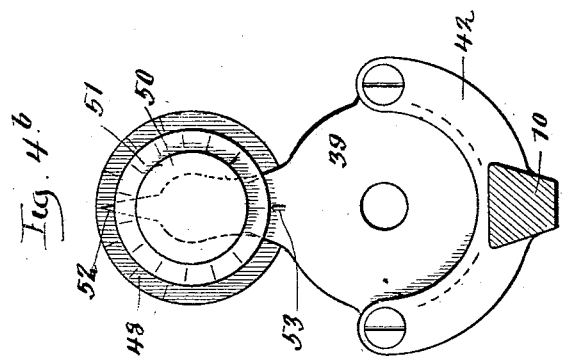
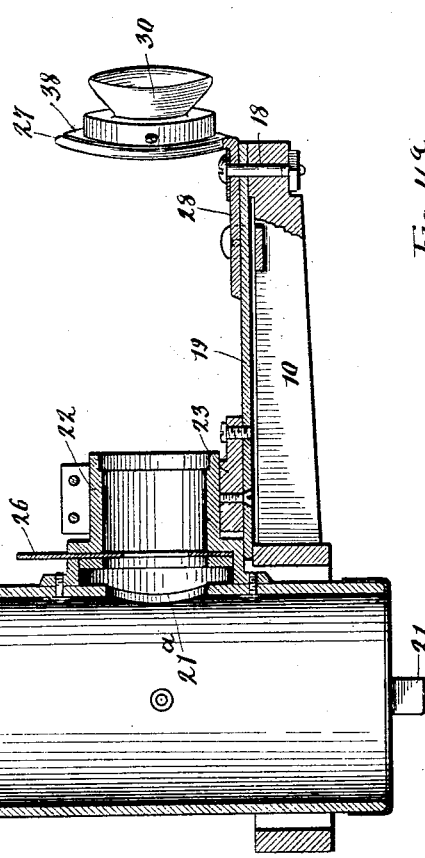
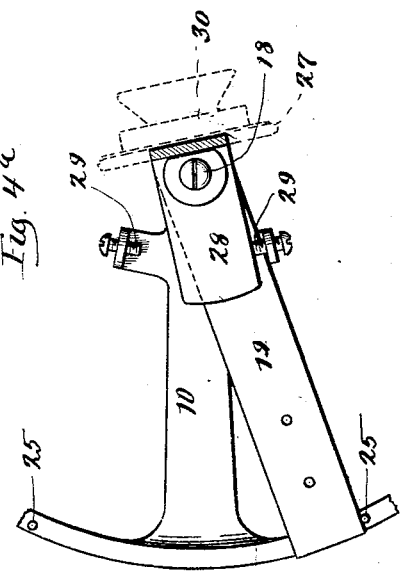
Witnesses:  
Inventor:

UNITED STATES PATENT OFFICE.

SETH A. RHODES, OF CHICAGO, ILLINOIS.

RETINOSCOPE.

SPECIFICATION forming part of Letters Patent No. 713,348, dated November 11, 1902.

Application filed February 27, 1901. Serial No. 49,143. (No model.)

*To all whom it may concern:*

Be it known that I, SETH A. RHODES, a resident of Chicago, county of Cook, State of Illinois, have invented certain new and useful Improvements in Retinoscopes, of which the following is a full, clear, and exact description.

The invention relates to that type of instruments known as "retinoscopes," used by oculists and others in making the "shadow test" for the detection of refractive errors in the eyes of a patient. It has been previously considered necessary in order to obtain a clear definition of the "luminous spot" and the "shadow" upon the retina of the patient's eye that the apparatus either be used in a dark room or that tubes be employed between the sources of light and the mirror and between the mirror and the patient's eyepiece in order to exclude all extraneous light. I provide an instrument which can be used under any circumstances and without necessitating a resort to a dark room, but in which the light-directing tubes are entirely dispensed with. I have found that it is possible to employ an open frame or support provided at one end with the usual tilting mirror and at the other end with an eyepiece, which may be of the usual form, but which is preferably of irregular outline to snugly fit about the patient's eye in order to exclude extraneous light between the lenses of the instrument and the eye. Although in such an instrument some of the light-rays from the mirror are necessarily dispersed, yet a sufficient number of rays will be projected to the eye of the patient within the dark pocket formed by the eyepiece to clearly define the so-called "luminous spot." Numerous advantages are incident to the use of an open frame. It is well known that the accuracy of the test depends upon the size of the luminous spot and the shadow and that such size depends upon the extent to which the pupil of the eye to be examined is extended. In an instrument in which a tube is employed between the mirror and the eyepiece the patient's eye is naturally directed at the reflected light of the mirror, and the pupil thereby contracted, and it is necessary to direct the patient to look at some distant object with the free eye, so that the gaze of the eye under examination will be removed from the mirror by sympathy therewith. By employing an open frame I am enabled to construct an instrument in which the patient may readily direct his gaze to some object beyond the mirror and can easily divert his attention from the reflected light. Furthermore, by the use of my open frame I am enabled to place the light-screen much nearer to the mirror than would be possible if a tube was employed, since the conduction of heat by the tube, if the light-screen were placed too near the mirror, would render the manipulation of the instrument disagreeable. By placing the light close to the mirror a fine definition of the luminous spot and reflection or shadow are attained.

The invention consists in the details of construction set forth in the following specification, illustrated in the drawings, and particularly set forth in the appended claims.

On the drawings like parts bear like designation throughout.

On the drawings, Figure 1 is a view in elevation of my improved retinoscope. Fig. 1$^a$ is a detail view in section of the standard and the bracket for supporting the chin-rest. Fig. 2 is a view in horizontal section taken on the line 2 2 of Fig. 1. Fig. 2$^a$ is a detail view, in vertical section, of the lens-disks and the patient's eyepiece. Fig. 2$^b$ is a detail sectional view of parts shown in Figs. 2, 2$^a$. Fig. 3 is a detail view in elevation of the left-hand end of the instrument. Fig. 3$^a$ is a detail view in elevation of the segmental lens-disk. Fig. 3$^b$ is a view in elevation of the tilting mirror and its support. Fig. 3$^c$ is a sectional view on the line 3$^c$ 3$^c$ of Fig. 3$^b$, showing the operator's eyepiece. Fig. 4 is a detail view, in vertical section, upon the line 4 4 of Fig. 2. Fig. 4$^a$ is a detail plane view of parts shown in Fig. 4. Fig. 4$^b$ is a detail view in cross-section upon the line 4$^b$ 4$^b$ of Fig. 1.

A longitudinal open frame or support 10 is carried upon a suitable standard consisting of the tripod 11, the sleeve 12, carried thereon, and the post 13, screw-threaded into the support and socketed within the sleeve, in which it is adjustably held by the set-screw 14.

Journaled upon one end of the support 10 is an upright 16 of irregular outline. This upright is secured in position by means of the screw 15 and is normally held in an upright position by means of a spring-pressed clickpin 16ª, normally engaging a notch in the end of the support 10. (See Fig. 2ᵇ.)

In the center of the upright 16 is socketed the patient's eyepiece 17. The eyepiece is, as shown, of such irregular outline as to fit snugly about the patient's eye and is pivoted frictionally upon the upright 16, so as to be reversible to fit either the right or the left eye, as is clearly shown in Figs. 2 and 2ª.

The light-screen and the tilting mirror-support are independently pivoted at the opposite end of the frame 10 by means of the bolt 18, provided at its opposite ends with a suitable washer and nut. By this means it will be seen that the light-screen and tilting mirror-support are movable in a horizontal plane and in arcs struck from a common center. The light-screen comprises a swinging arm 19, carrying at its free end the upright cylinder 20. The cylinder 20 is preferably constructed, to avoid radiation and conduction of heat, of asbestos board and is provided with the spring-clips 21, which serve to support within the cylinder any suitable source of light, such as a gas, gasolene, or oil burner or an electric lamp. The cylinder 20 is provided upon one side with an orifice 21ª, about which is secured a suitable cap 22, and to the arm 19 is secured a split ring 23, which engages the cap-piece 22, whereby the cylinder and the source of light are conveniently carried upon the end of the arm 19. The frame 10 is looped or bowed in order to provide, as at 24, an arc-shaped opening within which the cylinder 20 is movable from side to side, and upon one rail of the looped portion rests the end of the arm 19, as clearly shown in Figs. 2, 4, and 4ª. The rail of the looped section 24 is provided on either side with fixed pins or stops 25, which serve to limit the throw of the light-screen. The cap 22 is provided with a diaphragm 26, which may be interchangeable or may be of the form known as the "iris diaphragm," whereby definition of the light-rays projected upon the mirror by the light-carrier is secured. In order to secure greater definition of the light-rays, the cap 22 may, if desired, be provided with a suitable condensing-lens. By reason of the shift of the light-screen the cylinder 20 is quite removed from the field of vision of the free eye of the patient—that is, if the patient's left eye applied at the eyepiece 17 is undergoing examination it is important that the free or right eye shall have an unobstructed view directly forward, so that it may be fixed upon some distant object, thus enlarging its pupil and by sympathy enlarging the pupil of the eye undergoing examination and increasing the accuracy of the test; but this unobstructed view may not be had should the cylinder 20 then stand projected (see Fig. 2) as an obstacle at the operator's end of the instrument. The shift of the light-screen to the opposite side of the opening 24 removes the cylinder 20 wholly from the field and allows the patient to look with his free right eye straight ahead. When the right eye is undergoing examination and the patient's left eye is free, the light-carrier will be positioned as shown in Fig. 2.

In order that the tilting mirror shall occupy proper positions to project the light to the patient's eyepiece when the light-screen is in either position, it is mounted within an upright annular support 27, provided at its lower edge with a horizontal projecting stud or arm 28, frictionally pivoted to the bolt 18. As the light-screen is moved from side to side the arm 28 and annular support 27 are moved with it, since there is considerable friction developed between the arm 19 and the stud 28; but it is necessary in order that the mirror should properly project the light-rays to the eyepiece that it should move through only one-half of the angle described by the light-screen. For this reason adjustable screw-threaded stops 29 are provided in upwardly-extending ears upon the end of the support 10, which engage the stud or arm 28 and arrest the mirror-support in such positions that the light from the light-screen is properly projected to the patient's eyepiece.

Within the annular support at the operator's end of the instrument is rotatably mounted the socket or ring 30, which is provided on its front end with a diaphragm having a suitable eyepiece or view-opening for the operator. The socket is nicely fitted to turn in the annular support and is frictionally held therein by means of spring-clips 31, secured to the annular support by wedges 31ª, and provided with inwardly-turned ends engaging an annular groove upon the socket, as clearly shown in Fig. 3ᶜ. A disk 32 is pivotally mounted within the socket by means of a pintle 33, which projects from the side of the socket into a hole in the disk and at a position in diametrical line with a suitable handle 34, which passes through a hole in the wall of the socket and is screw-threaded into the disk. The parts are so arranged that the disk may be easily slipped from place by removing the threaded pintle 33 and handle 34. The disk 32 is provided with a central peep-hole 35 and supports the silvered mirror 36, also provided with a central peep-hole in alinement with the opening 35. Light curved springs 37 are fastened to the socket or eyepiece and bear at diametrically opposite points upon the tilting mirror-disk 32. By means of the handle 34 the eyepiece or socket 30 and the mirror-disk carried thereby may be rotated within the annular support 27, and at the same time the mirror can be tilted against the light pressure of springs 37. The meridian in which the mirror is tilted will be indicated upon a suitable scale 38, secured to the face of the annular support 27. The eye of the patient may thus be examined in all meridians, and the plane of astigmatism in an eye so defective will be indicated upon the scale. The light springs 37 always tend to return the mirror-disk to the normal and assist the operator in readily affixing such normal from which the tilt of the mirror may proceed in either direction.

It will be observed that the diaphragm of socket 30 is positioned before the tilting mirror-disk 32 and that the view-opening therein has a diameter considerably smaller than that of the mirror-disk, so that the operator in making a test is not annoyed by the movement of the mirror in front of his eye, as in prior constructions.

Intermediate the mirror and the patient's eyepiece are located upon the frame uprights or diaphragms 39 and 40, which are provided with openings and which serve to arrest and absorb the dispersed light which would otherwise affect the desired clearness of definition. The upright or diaphragm 40 is secured upon the shouldered end of the upright 10 by a threaded washer 41, placed intermediate the diaphragm 40 and the upright 16, as shown in Fig. 2ª. The diaphragm 39 abuts against a U-shaped projection 42 on the frame 10 and is secured in place and, together with the diaphragm 40, is braced in position by the hollow rods 43. These hollow rods are secured at one end to the diaphragm 40 by screws and at the other end by screws passing through the U-piece 42 and the diaphragm 39. The space between the diaphragm 40 and the upright 16 serves to admit the lens-disk 44 and the segmental lens-disk 45, each of which is furnished with a battery of lenses 46 of various strengths to suit the needs of the operator. Preferably the disk 44 and the segment 45 are concentrically mounted and provided with concave and convex lenses of varying degrees of curvature, so that any desired combination of lenses in the two disks can be brought to coincide with the eyepiece 17. The disks are capable of rotation independently of each other, and the diaphragms 39 and 40 at their upper ends are provided with journal-bearings for the hollow sleeve or rod 46, fastened at one end to the segmental disk 45 and provided at the other end with a thumb-nut 47 and scale-disk 48. Through the sleeve 46 extends a rod 49, which serves to sustain the lens-disk 44 at one end and which is provided at the other end with a thumb-nut 50 and scale-disk 51. A pointer 52 is secured to the upper end of the diaphragm 39 intermediate the disk scales 48 and 51 and coöperates with the disk scale 48. An indicator 53 upon the outer face of the diaphragm 39 coöperates with the scale 51. A bifurcated spring 44ª, secured to the diaphragm 40, projects into the path of the lens-disks 44 and 45 and engages at intervals with the notched rims thereof to hold either disk stationary despite the movement of the other. The diaphragm 40 is provided at its upper end with an outwardly-turned lug 40ª, which acts as a stop to limit the rotation of the segmental lens-disk 45. The adjusting-nuts 47 and 50 are brought within handy reach of the operator and may be freely manipulated without disturbing the set of the instrument.

The scale-disks and indicating-pointers are so located that they may be viewed by the operator through the peep-hole in the mirror, and from these scales the desired strength and nature of the lens to correct the refractive error of the eye can be readily calculated. The thumb-nut 47 and scale-disk 48 and the thumb-nut 50 and scale-disk 51 are removably secured in position upon the sleeve 46 and rod 49 by means of the set-screws 54. By loosening these screws and by turning the upright 16 into a downwardly-projecting position the lens-disks 44 and 45 and their adjuncts are conveniently removable for cleaning the lenses.

In prior forms of retinoscopes employing tubular constructions the light-supply tube has been removed from the field of view of the free eye of the patient by revolving the entire structure in a vertical plane or by revolving a section of the tube in a similar manner. In my open-frame construction, upon which the light-screen is pivoted to swing from side to side in a horizontal plane across the line of the mirror and the patient's eyepiece and in which the mirror is independently centered upon the pivot of the light-screen and automatically positioned to transmit the light-rays to the patient's eyepiece, it is possible to shift the light-screen from side to side for the examination of either eye without disturbing the set either of the lenses or of the rotatable mirror, which thus stay undisturbed and adjusted for symmetric test of either eye in turn. With previous forms it has been necessary to reset the lenses and the mirror, one or both, after the shift of the light-screen. Furthermore, the transverse shift in a horizontal plane of the light-screen within the arc-shaped opening 24 renders it unnecessary to remove a gas or gasolene burner, oil-lamp, or similar light-supply, which may be located in the light-screen before shifting the same, which is of course necessary where the light-screen is rotatably shifted in a vertical plane. In this construction, therefore, the light-screen, with any sort of light-supply, may be quickly shifted from side to side. The mirror when once stops 29 are properly adjusted will be automatically positioned, so that the proper relation is maintained of the light-supply, the mirror, and the patient's eyepiece. The lens-disks and mirror-supporting socket do not require readjustment for symmetric test of either eye, and the handle 34 is always within easy reach for rotating the mirror-supporting socket and for tilting the mirror back and forth, as necessary for study of the luminous spot and the shadow at the eye of the patient. By reason of these advantages and since the indicating-scales for the lenses are conveniently located within the field of vision of the operator examinations can be made and accurate results derived in a very short space of time. This is of great advantage, since under the most favorable conditions the sensitive structure of the eye soon becomes tired when undergoing a test of this sort. For this reason, too, the shifting mirror-support, which can be easily and rapidly adjusted, presents decided advantages over retinoscopes in which a shifting light and a fixed mirror are used, since the manipulation of the latter form requires a much longer period of time to arrive at correct results. It will be observed that the patient's eyepiece and the operator's mirror are fixed in position upon the frame at a definite distance. The test-lenses are corrected for this distance, so that no correction is necessary in making the calculation for the required lens. Moreover, the arrangement is such that the light-ray from the mirror is directed into the patient's eye automatically and requires no manipulation on the part of the operator, as in the ordinary hand-retinoscope. Furthermore, by reason of the open-frame construction the light-screen may be placed close to the mirror, thereby insuring greater definition of the luminous spot, and the patient can readily direct his gaze away from the mirror, thus avoiding the contraction of the pupil of the eye under examination.

In order to induce dilation of the free eye and by sympathy induce corresponding dilation in the eye under examination, means are provided on either side of the eyepiece 16 for supporting a "fogging" or plus lens. These lens-supports 55 are frictionally pivoted for convenient adjustment upon laterally-projecting lugs on the upright 16, as most clearly shown in Fig. 3.

If desired, a lens-support 40$^b$ may be mounted upon the diaphragm 40, in which may be placed a lens of the nature and strength calculated from the examination, and further test may be made to verify the accuracy of the examination.

Means are provided for suitably supporting upon the standard of the instrument a chin-rest beneath the patient's eyepiece 16. This means consists of a vertically-adjustable V-shaped bracket 56, provided at its lower end with a semicircular bearing for engaging the sleeve 12 and at its upper end with a split collar 57, engaging the post 13. A pinch-screw 58 serves to sustain the bracket 56 in any desired position. Within a pocket at the point of the V-shaped bracket 56 is pivotally mounted a rearwardly-extending arm 59, which is adjustably held in a horizontal position by a thumb-screw 60, engaging a lug on the arm adjacent its pivot. The arm 59 is provided at its end with lateral projections 61, to the ends of which are pivoted the parallel arms 62. The chin-rest 63 is pivotally supported upon the ends of these arms 62 in such a manner as to be conveniently shiftable for the examination of either eye. By means of the adjusting-screw 60 the chin-rest may be conveniently placed at any desired height.

Details can be varied according to the mechanic's skill without essential departure from the invention.

Having thus described my invention, what I claim as new, and desire to secure by Letters Patent, is—

1. In retinoscopes, the combination with a horizontal open frame, of a standard therefor upon which said frame is adjustably mounted, uprights secured in position on opposite ends of said open frame, a ring rotatably mounted on one of said uprights, a tilting mirror mounted in said ring, a patient's eyepiece mounted in the other of said uprights, a lens-support mounted upon said frame before said eyepiece and a light-screen mounted on said frame to one side of the line of said mirror and eyepiece, the parts being so positioned that the ray from the light-screen is projected by the mirror to the eyepiece.

2. In retinoscopes, the combination with a support, of a mirror and a patient's eyepiece mounted thereon in opposed relation, and a light-screen shiftably mounted on said support, so as to be movable transversely in a horizontal plane across the line of said mirror and eyepiece and to opposite sides thereof.

3. In retinoscopes, the combination with a support, of a mirror and a patient's eyepiece mounted thereon in opposed relation, and a light-screen pivotally mounted on said support to swing transversely in a horizontal plane across the line of said mirror and eyepiece and to opposite sides thereof.

4. In retinoscopes, the combination with a support, of a mirror and a patient's eyepiece mounted thereon in opposed relation, and a light-screen comprising an arm pivoted to said support and an apertured cylinder mounted on the free end of said arm provided with means for supporting a lamp therein, said light-screen being arranged to swing transversely in a horizontal plane between said mirror and eyepiece, and stops for limiting the throw of said light-screen.

5. In retinoscopes, the combination with a frame, of a patient's eyepiece and a mirror-support mounted thereon in opposed relation, a ring rotatably mounted in said mirror-support, a tilting mirror carried by said ring and a light-screen mounted on said frame, said light-screen and said mirror-support being independently shiftable from side to side in a horizontal plane.

6. In retinoscopes, the combination with a frame, of a patient's eyepiece and a mirror-support mounted thereon in opposed relation, a ring rotatably mounted in said mirror-support, a tilting mirror carried by said ring and a light-screen mounted on said frame, said light-screen and said mirror-support being independently shiftable in a horizontal plane from side to side about a common center.

7. In retinoscopes, the combination with a support, of a mirror-support and light-screen pivotally mounted thereon and independently movable about a common center, and independent sets of stops for limiting the movement of said light-screen and of said mirror-support respectively.

8. In retinoscopes, the combination with a support, of a patient's eyepiece mounted upon one end thereof, and a light-screen and mirror-support pivoted to swing independently upon a common center at the opposite end of said support, fixed stops for limiting the movement of said light-screen and adjustable stops for limiting the movement of said mirror-support.

9. In retinoscopes, the combination with a support, of an eyepiece and a tilting mirror mounted thereon in opposed relation, a shiftable support for said mirror and a shiftable light-screen; said mirror-support and said light-screen being attached to said support by a common pivot.

10. In retinoscopes, the combination with the open frame or support, of the patient's eyepiece mounted upon one end thereof, the tilting mirror-support and the light-screen mounted to swing independently in a horizontal plane upon a common pivot at the opposite end of said open frame or support, and the independent sets of stops for said light-screen and said mirror-support.

11. In retinoscopes, the combination with a horizontal open frame, of a standard therefor upon which said frame is adjustably mounted, uprights secured in position on opposite ends of said open frame, a ring rotatably mounted upon one of said uprights, a tilting mirror mounted in said ring, a patient's eyepiece mounted in the other of said uprights, a lens-support mounted upon said frame before said eyepiece, a light-screen mounted on said frame to one side of said mirror and said eyepiece, the parts being so positioned that the ray from the light-screen is projected by the mirror to the eyepiece, and one or more diaphragms upon said open frames intermediate the eyepiece and the mirror to obstruct and absorb the dispersed rays.

12. In retinoscopes, the combination with the open frame or support, of the mirror having a central peep-hole and the patient's eyepiece mounted in opposed relation thereon, the light-screen supported on said frame to one side of the line of said mirror and eyepiece, the set of lenses mounted upon the frame and movable before the patient's eyepiece, and a scale connected to said lenses in position to be viewed through the central peep-hole of the mirror.

13. In retinoscopes, the combination with an open frame or support, of a mirror having a central peep-hole and a patient's eyepiece held at defined distance and in opposed relation on said frame or support, companion lens-disks mounted in adjacent, concentric relation before said eyepiece and independent operating-rods for said lens-disks sleeved together, projecting toward the mirror and provided at their inner ends with thumb-pieces and scale-disks, the latter being in position to be viewed through the mirror peep-hole.

14. In retinoscopes, the combination with a support, of a mirror and a patient's eyepiece carried in opposed relation thereon, a light-screen, the rays from which are directed to said eyepiece by said mirror, and adjustable lens-holders mounted on each side of said eyepiece.

15. In retinoscopes, the combination with a support, of a mirror and an eyepiece mounted thereon in opposed relation, said eyepiece being reversibly mounted and of such irregular outline as to snugly fit about either eye of the patient.

16. In a retinoscope, the combination with a support, of a mirror and a patient's eyepiece mounted in opposed relation thereon, a standard for said support and a chin-rest supported beneath said eyepiece by a pair of parallel pivoted arms carried by said standard to swing in a horizontal plane.

17. In retinoscopes, the combination with a support, of a mirror and a patient's eyepiece mounted in opposed relation thereon, a standard for said support, a chin-rest supported beneath said eyepiece, by a horizontally-pivoted arm, carried by said standard, and an adjusting-screw for said arm arranged adjacent the pivot thereof.

18. In retinoscopes, the combination with a support, of a mirror and a patient's eyepiece mounted in opposed relation thereon, a standard for said support, a vertically-adjustable bracket on said standard, provided with a vertically-adjustable swinging arm, and a chin-rest carried by said arm beneath said eyepiece.

19. In retinoscopes, the combination with a frame, of a mirror-support and a patient's eyepiece mounted thereon in opposed relation, a socket rotatably mounted in said mirror-support, a tilting mirror having a peep-hole mounted in said socket, and a diaphragm on said socket before said mirror provided with a view-opening for the operator of smaller diameter than said mirror and in line with the peep-hole thereof.

20. In optical instruments, the combination with a frame adapted at one end for the patient, of a tilting mirror having a peep-hole mounted at the opposite end of said frame and a diaphragm before said mirror having a view-opening for the operator of smaller diameter than said mirror and in line with the peep-hole thereof.

21. In retinoscopes, the combination with an open frame, of a mirror and a patient's eyepiece secured at definite distance and in opposed relation upon said open frame, a light-screen mounted on said frame to one side of the line of said mirror and eyepiece, a lens-carrier shiftably mounted on the frame in front of said eyepiece and an additional fixed lens-holder secured on the frame in front of said eyepiece and adjacent said shiftable lens-holder, substantially as described.

22. In retinoscopes, the combination with a horizontal open frame, supports held at opposite ends of said open frame at definite distance and in opposed relation, a mirror carried by one of said supports and a patient's eyepiece carried by the other of said supports, a lens-carrier mounted upon said frame before said eyepiece and a light-screen mounted on the frame to one side of the mirror and eyepiece, the parts being so positioned that the ray from the light-screen is projected by the mirror to the eyepiece.

23. In retinoscopes, the combination with a substantially horizontal open frame, of a pair of supports held upon said frame at definite distance and in opposed relation, a mirror having a peep-hole mounted on one of said supports and a patient's eyepiece mounted on the other of said supports, a light-screen mounted on said frame to one side of the line of said mirror and eyepiece, a shiftable lens-holder carried on said frame in front of said eyepiece and a scale for said lens-holder positioned to be viewed through the mirror peep-hole.

24. In retinoscopes, the combination with a substantially horizontal frame, a mirror-support and a patient's eyepiece held thereon at definite distance and in opposed relation, a tilting mirror carried by said support and a light-screen mounted on said frame to one side of the line of said mirror and eyepiece, said mirror-support being transversely shiftable from side to side upon a fixed vertical pivot.

SETH A. RHODES.

Witnesses:
THOMAS FLACK,
HARRY L. CLAPP.